(12) United States Patent
Manoselvam

(10) Patent No.: US 11,171,986 B2
(45) Date of Patent: Nov. 9, 2021

(54) RESOLVING REDIRECTS FOR ENHANCED SECURITY

(71) Applicant: Accenture Global Solutions Limited, Dublin (IE)

(72) Inventor: Vicknesh Manoselvam, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 419 days.

(21) Appl. No.: 16/417,849

(22) Filed: May 21, 2019

(65) Prior Publication Data
US 2020/0374313 A1    Nov. 26, 2020

(51) Int. Cl.
*H04L 29/06* (2006.01)
*G06N 20/00* (2019.01)
*G06F 16/955* (2019.01)
*H04L 29/08* (2006.01)

(52) U.S. Cl.
CPC ...... *H04L 63/1483* (2013.01); *G06F 16/9558* (2019.01); *G06N 20/00* (2019.01); *H04L 63/1416* (2013.01); *H04L 67/02* (2013.01)

(58) Field of Classification Search
CPC . H04L 63/1483; H04L 63/1416; H04L 67/02; G06F 16/9558; G06N 20/00
See application file for complete search history.

(56) References Cited

U.S. PATENT DOCUMENTS

| 7,853,719 | B1 * | 12/2010 | Cao .................... G06F 16/9566 709/245 |
| 8,789,177 | B1 | 7/2014 | Johnston et al. |
| 8,869,271 | B2 | 10/2014 | Jayaraman et al. |
| 2011/0145435 | A1 * | 6/2011 | Bhatawdekar .......... G06F 21/64 709/238 |
| 2015/0200962 | A1 | 7/2015 | Xu et al. |
| 2020/0252803 | A1 * | 8/2020 | Shah .................... G06N 20/20 |

OTHER PUBLICATIONS

Hans et al. "An adaptive neuro-fuzzy inference system for detecting redirection spam", 2018, pp. 1-6 (Year: 2018).*
Sahoo et al. "Malicious URL Detection using Machine Learning: A Survey", 2017, v1, pp. 1-20 (Year: 2017).*

* cited by examiner

*Primary Examiner* — Arvin Eskandarnia
(74) *Attorney, Agent, or Firm* — Fish & Richardson P.C.

(57) ABSTRACT

Implementations include receiving, by a redirection resolver, a URL identifying a location of a network resource, processing, by the redirection resolver, the URL to provide a set of results including a set of redirection URLs, the set of redirection URLs including one or more redirections between the URL and an end URL, processing the set of redirection URLs to provide input to a machine learning (ML) model that generates an output based on the set of redirection URLs, determining an error value associated with the URL, and providing an indicator assigned to the URL based on the error value, the indicator indicating whether the URL is determined to be potentially malicious.

33 Claims, 5 Drawing Sheets

RESOLVING REDIRECTS FOR ENHANCED SECURITY

BACKGROUND

A uniform resource locator (URL) can be described as a reference to a network resource (e.g., web page). The URL specifies the location of the network resource within a computer network (e.g., the Internet) and enables retrieval of the network resource. For example, the URL can be input to a web browser and the network resource (e.g., web page) can be displayed in the web browser.

In some instances, a URL can be relatively long. Long URLs may be impractical and/or unwieldy. For example, a user may want to share a URL by copying and pasting a URL into a message (e.g., a social media post, an email message). However, a URL may be too long for inclusion in the message (e.g., in messages having limits on number of characters). In view of this, URL shortening services provide a shortened URL that redirects to the network resource identified by a URL, which can be referred to as a redirection page. In some instances, a web page identified by a URL can redirect to another web page. For example, the web page can include Javascript (e.g., using location.href or location.replace) that redirects to another URL, which can also be referred to as a redirection page.

Malicious domains (URLs) can evade security detection by hiding behind redirection pages. Hiding behind redirection pages can be achieved using a URL shortening, or using in-page redirections (e.g., Javascript redirections). Traditional systems are unable to effectively resolve such hidden or masked URLs. Consequently, malicious activity may be undetected.

SUMMARY

Implementations of the present disclosure are generally directed to unmasking input URLs to root URLs. More particularly, implementations of the present disclosure are directed to a URL resolution tool that resolves URLs to individual redirects and final redirection for cyber evaluation, and that provides a risk-score for each URL based on redirection routes and nature.

In some implementations, actions include receiving, by a redirection resolver, a URL identifying a location of a network resource, processing, by the redirection resolver, the URL to provide a set of results including a set of redirection URLs, the set of redirection URLs including one or more redirections between the URL and an end URL, processing the set of redirection URLs to provide input to a machine learning (ML) model that generates an output based on the set of redirection URLs, determining an error value associated with the URL, and providing an indicator assigned to the URL based on the error value, the indicator indicating whether the URL is determined to be potentially malicious. Other implementations of this aspect include corresponding systems, apparatus, and computer programs, configured to perform the actions of the methods, encoded on computer storage devices.

These and other implementations can each optionally include one or more of the following features: processing the URL to provide the set of results includes processing the URL through a hypertext transfer protocol (HTTP) scanner based on a set of HTTP methods to provide a sub-set of results that represents one or more server redirects of the URL; processing the URL through the HTTP scanner is executed multiple times to account for any inconsistency in redirections; processing the URL through the HTTP scanner includes processing both HTTP and HTTP secure (HTTPS) protocols; processing the URL to provide the set of results includes processing the URL through a browser simulator to provide a sub-set of results that represents one or more page redirects of the URL; processing the URL through the browser simulator is executed multiple times to account for any inconsistency in redirections; processing the URL through the browser simulator includes processing both HTTP and HTTP secure (HTTPS) protocols; the ML model includes an autoencoder that is trained based on redirection behavior of a set of trusted URLs; providing the indicator includes: comparing the error value to a threshold error value, and determining that the error value exceeds the threshold error value, and in response, setting the indicator to a value that indicates that the URL is potentially malicious and providing the indicator includes: comparing the error value to a threshold error value, and determining that the error value does not exceed the threshold error value, and in response, setting the indicator to a value that indicates that the URL is not potentially malicious.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
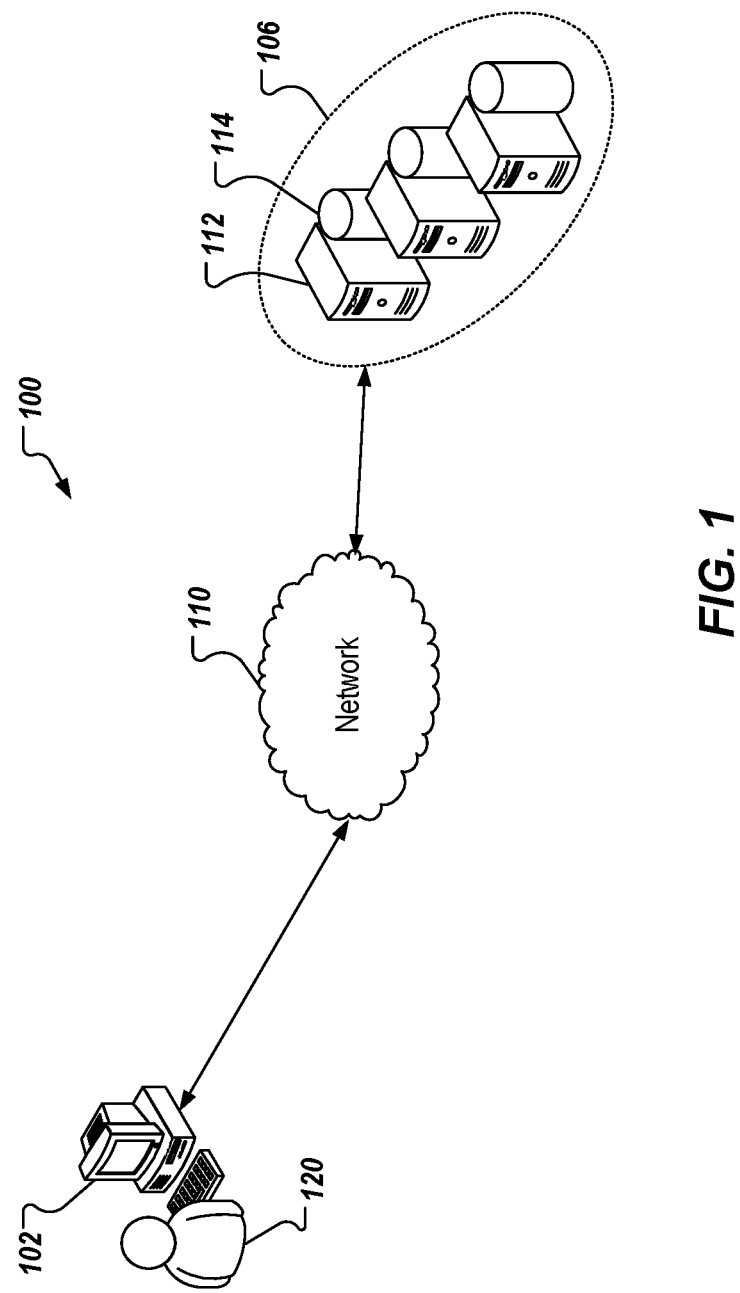
FIG. 1 depicts an example system that can execute implementations of the present disclosure.

Implementations of the present disclosure are generally directed to unmasking input uniform resource locators (URLs) URL (e.g., start URLs) to root URLs (e.g., end URLs). More particularly, implementations of the present disclosure are directed to a URL resolution platform that resolves URLs to individual redirects and final redirection for cyber evaluation, and that provides a risk-score for each URL based on redirection routes and nature. In some implementations, actions include receiving, by a redirection resolver, a URL identifying a location of a network resource, processing, by the redirection resolver, the URL to provide a set of results including a set of redirection URLs, the set of redirection URLs including one or more redirections between the URL and an end URL, processing the set of redirection URLs to provide input to a machine learning (ML) model that generates an output based on the set of redirection URLs, determining an error value associated with the URL, and providing an indicator assigned to the URL based on the error value, the indicator indicating whether the URL is determined to be potentially malicious.

To provide further context for implementations of the present disclosure, and as introduced above, in some instances, a URL can be relatively long. Long URLs may be impractical and/or unwieldy. For example, a user may want to share a URL by copying and pasting a URL into a message (e.g., a social media post, an email message). However, a URL may be too long for inclusion in the message (e.g., in messages having limits on number of characters). In view of this, URL shortening services provide a shortened URL that redirects to the network resource identified by a URL, which can be referred to as a redirection page. In some instances, a web page identified by a URL can redirect to another web page. For example, the web page can include Javascript (e.g., using location.href or location.replace) that redirects to another URL, which can also be referred to as a redirection page.

Malicious domains (URLs) can evade security detection by hiding behind shortened URLs and redirection pages. Hiding behind redirection pages can be achieved using a URL shortening, or using in-page redirections (e.g., Javascript redirections). Different types of redirections can include different levels of risk in terms of potential for malicious activity. For example, a path redirection can be determined to be relatively low risk. In general, a path redirection is a redirection to a different URL within a domain (e.g., http://httpbin.org/redirect/3 redirecting to http://httpbin.org/get remains within the httpbin domain). As another example, a domain redirection can be determined to be relatively medium risk (e.g., http://abc.com redirecting to http://abc.go.com changes domains from abc to abc.go). As still another example, a domain and context redirection can be determined to be relatively high risk (e.g., http://bit.ly/1RmnUT redirecting to https://www.google.com). Traditional systems are unable to effectively resolve such hidden or masked URLs. Consequently, malicious activity may be undetected.

In view of the above context, implementations of the present disclosure provide a URL resolution platform that resolves URLs to individual redirects and final redirection for cyber evaluation, and that provides a risk-score for each URL based on redirection routes and nature. As described in further detail herein, the URL resolution platform of the present disclosure includes a redirection resolver and a machine learning (ML) model. In some examples, the redirection resolver resolves redirections from a start URL to an end URL and provides a list of redirection URLs. In some examples, the ML model is trained using known databases of trusted URLs (also referred to as good URLs) to differentiate trusted URLs from un-trusted URLs based on multiple attributes including redirection nature. In some implementations, the URL resolution platform is provided as an application program interface (API) or appliance that existing security solutions (e.g., security information and event management (SIEM) systems) or ticketing solutions (e.g., ServiceNow) can consume to resolve and evaluate redirecting URLs.

FIG. 1 depicts an example system 100 that can execute implementations of the present disclosure. The example system 100 includes a computing device 102, a back-end system 106, and a network 110. In some examples, the network 110 includes a local area network (LAN), wide area network (WAN), the Internet, or a combination thereof, and connects web sites, devices (e.g., the computing device 102), and back-end systems (e.g., the back-end system 106). In some examples, the network 110 can be accessed over a wired and/or a wireless communications link. For example, mobile computing devices, such as smartphones can utilize a cellular network to access the network 110.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 106 includes at least one server system 112, and data store 114 (e.g., database). In some examples, the at least one server system 112 hosts one or more computer-implemented services that users can interact with using computing devices. For example, the server system 112 of the back-end system 106 can host a URL resolution platform in accordance with implementations of the present disclosure. In some implementations, a URL can be provided to the URL resolution platform hosted on the back-end system 106 (e.g., from the computing device 102). In response to receiving the URL, the URL resolution platform processes the URL to provide a risk score that represents a relative risk that one or more URL redirects associated with the URL are malicious.

Figure 2:
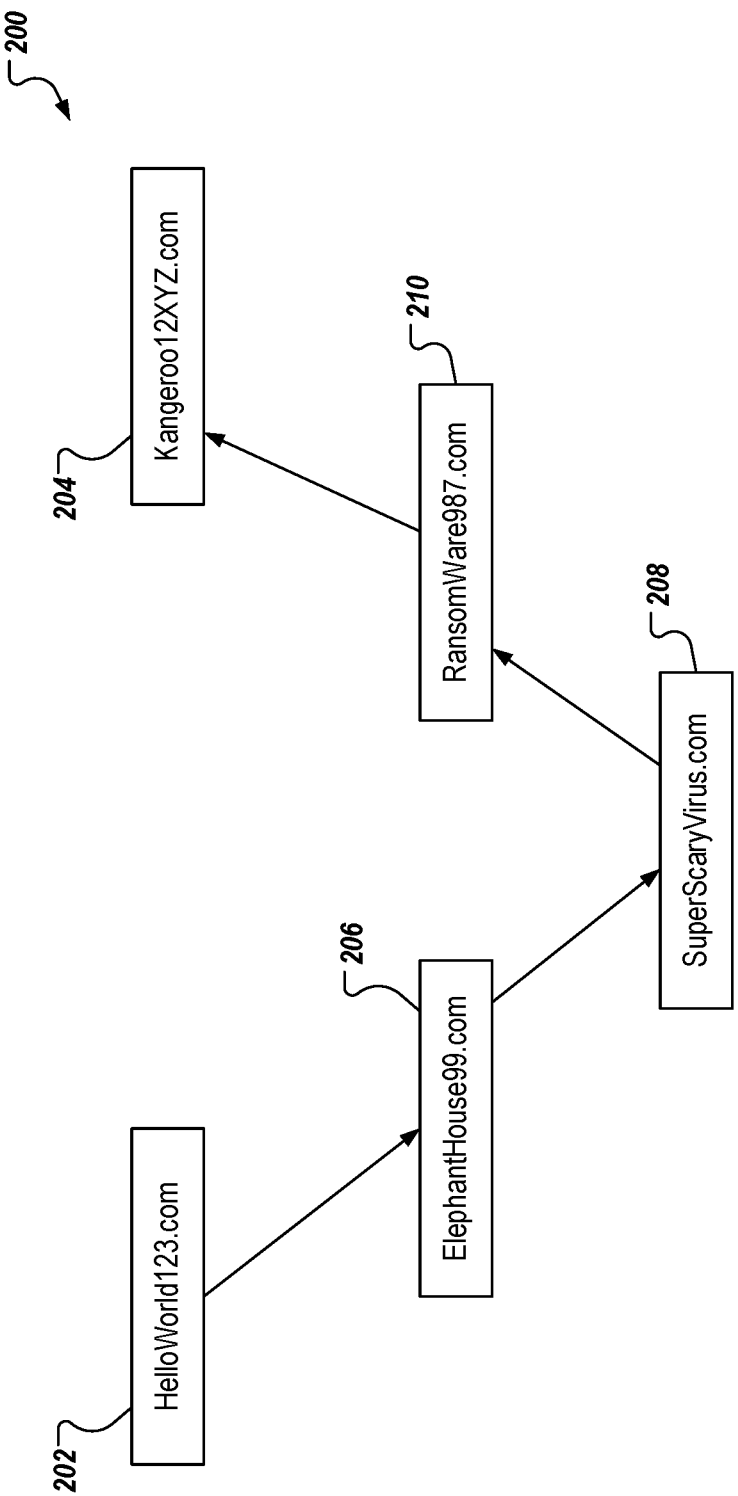
FIG. 2 depicts an example uniform resource locator (URL) redirection.

FIG. 2 depicts an example redirection 200. The example redirection 200 includes a start URL 202 that is redirected to an end URL 204. In some examples, the start URL 202 is logged (e.g., by a server), while the end URL 204 is not logged. In some examples, the end URL 204 is only visible, if a web browser is being used (e.g., the end URL 204 is displayed in an address bar of the web browser). In the example of FIG. 2, four redirections are depicted. A first redirection is from the start URL 202 to an intermediate URL 206, a second redirection is from the intermediate URL 206 to an intermediate URL 208, a third redirection is from the intermediate URL 208 to an intermediate URL 210, and a fourth redirection is from the intermediate URL 210 to the end URL 204. The intermediate URLs 206, 208, 210 present the highest risk, as these are invisible links, one or more of which can include malicious operations on data that is being transmitted (e.g., man-in-the-middle attack). Further, the intermediate URLs 206, 208, 210 are not logged (e.g., by a server).

As described in further detail herein, implementations of the present disclosure provide a redirection resolver and a ML model. In a training phase, the redirection resolver processes a set of trusted URLs to provide a set of trusted redirection URLs for each trusted URL. The sets of trusted redirection URLs are used as training data that is used to train the ML model. In a production phase, the redirection resolver and the trained ML model are used to evaluate URLs and provide risk scores for respective URLs, the risk scores indicating a relative risk of malicious activity for the respective URLs.

Figure 3:
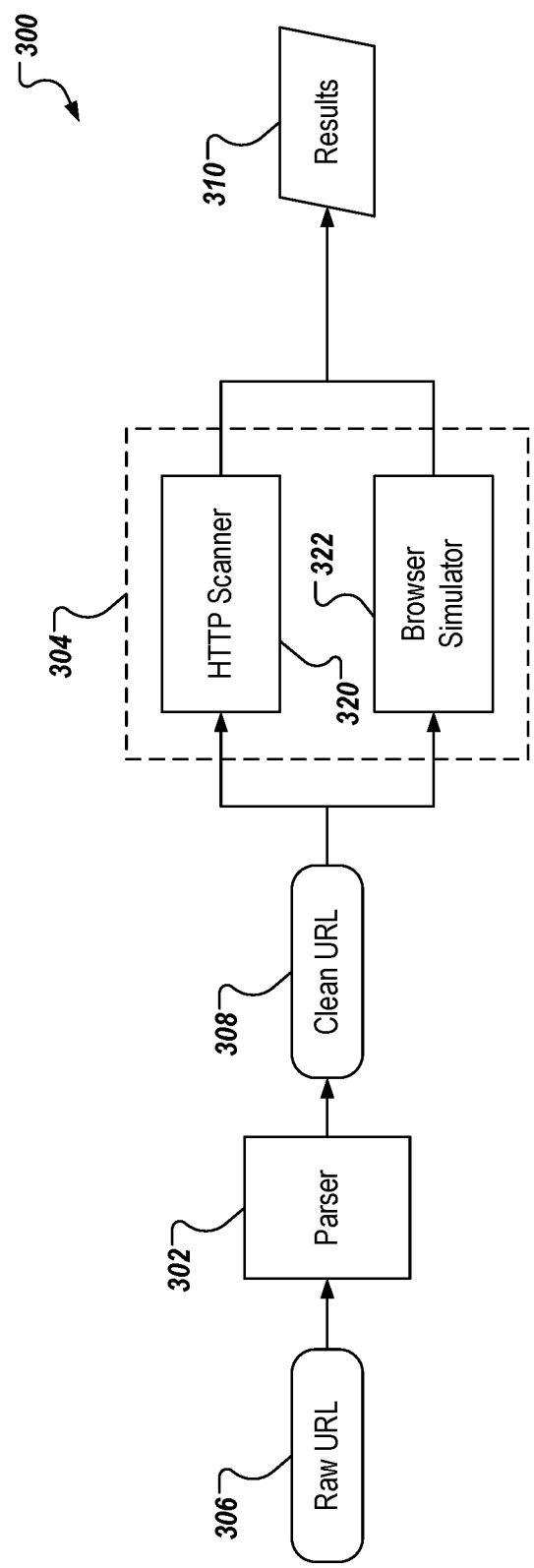
FIG. 3 depicts an example redirection resolver in accordance with implementations of the present disclosure.

FIG. 3 depicts an example module architecture 300 in accordance with implementations of the present disclosure. The example module architecture 300 depicts URL redirection resolution in accordance with implementations of the present disclosure. In the example of FIG. 3, a redirection resolver 302 and a parser 304 are provided. In some examples, the parser 304 receives a raw URL 306 and provides a clean URL 308 based thereon. For example, the parser 304 splits the raw URL 306 into sub-units that are used for data validation, quality, and pre-processing. For example, the sub-units can be used to create variants of the URL. An example raw URL can include, without limitation, https://www.apple.com/imac/specs/, which can be parsed to provide sub-units of:

Scheme: https://
Sub-domain: www
Domain: apple
Top-level Domain: com
Path: /imac/specs/

In some implementations, and as described in further detail herein, the redirection resolver 302 processes the clean URL 308 to generate a set of results 310. In some examples, the set of results 310 includes a set of redirection URLs that represent redirections from the raw URL 306. In some implementations, in the training phase, the set of results 310, including the set of redirection URLs, is used to train the ML model, described in further detail herein. That is, for example, the raw URL 306 is provided as a trusted URL from a trusted URL source. Consequently, the set of results 310 are representative of the trusted URL. In some examples, in the production phase, the set of results 310, including the set of redirection URLs, are provided as input to the ML model, which determines a risk score for the raw URL 306 that the set of results 310 is based on.

In further detail, and as depicted in the example of FIG. 3, the redirection resolver 302 includes a hypertext transfer protocol (HTTP) scanner module 320 and a browser simulator module 322. As described in further detail herein, the HTTP scanner module 320 resolves server redirects (e.g., based on shortened URLs), and the browser simulator module 322 resolves page redirects (e.g., based on Javascript redirects).

In accordance with implementations of the present disclosure, the HTTP scanner module 320 and the browser simulator module 322 each processes the clean URL 308 to generate respective result sets. The respective result sets are combined to provide the set of results 310. In some examples, the set of results 310 includes an end URL (also referred to as unmasked URL), a number of redirections, a matrix of HTTP methods, and browser results.

In some implementations, the HTTP scanner module 320 executes a set of HTTP methods based on the clean URL 308. An example set of HTTP methods includes, without limitation, [HEAD, GET, OPTIONS, TRACE, POST, PUT, DELETE, PATCH]. In some examples, execution of the set of HTTP methods provides a set of request results. For example, for the example set of HTTP methods, a set of request results is provided that includes seven (7) request results. In some implementations, the set of request results includes an end URL (also referred to as unmasked URL), a number of redirections, and a matrix of HTTP methods. In some examples, the matrix of HTTP methods includes, for each HTTP method and without limitation, the number of re-directions, a list of re-direction URLs, a length of each re-direction URL, an end URL, and a duration of each re-direction by which HTTP method.

In some examples, the HTTP scanner module 320 executes the set of HTTP methods for both HTTP and HTTP secure (HTTPs). In this manner, a first set of request results is provided for HTTP and a second set of request results is provided for HTTPs. For example, for the example set of HTTP methods, a first set of request results is provided that includes seven (7) request results using HTTP, and a second set of request results is provided that includes seven (7) request results using HTTPs. In this example, the first set of request results and the second set of request results can be combined to provide a set of request results (e.g., that includes fourteen (14) request results).

In some implementations, the HTTP scanner module 320 executes multiple times for each clean URL 308. In this manner, consistency between results can be checked. For example, in some instances, redirection from a start URL is dynamic. That is, for example, at a first time, a first redirection path from a start URL is provided, and, at a second time, a second redirection path from the start URL is provided and is different from the first redirection path. By executing the scan multiple times, consistency (or inconsistency) of redirect paths from a clean URL 308 can be accounted for. For example, the scan can be executed three (3) times. Using the examples above, a set of request results would include forty-two (42) request results (e.g., three sets of request results, each having fourteen (14) request results).

In some implementations, the browser simulator module 322 executes a browser simulator that navigates web pages based on the clean URL 308. An example browser simulator includes, without limitation, Selenium WebDriver. In general, the browser simulator executed by the browser simulator module 322 programmatically inputs the clean URL 308 to an address field of a programmatic web browser, and records any page-based redirects to an end URL. In this manner, the browser simulator module 322 provides a set of redirected URLs from the clean URL 308 to the end URL.

In some examples, the browser simulation module 322 executes the set of HTTP methods for both HTTP and HTTPs. In this manner, a first set of request results is provided for HTTP and a second set of request results is provided for HTTPs. For example, a first request result is provided that includes one (1) request result using HTTP, and a second request result is provided that includes one (1) request result using HTTPs. In this example, the first request result and the second request result can be combined to provide a set of request results (e.g., that includes two (2) request results).

In some implementations, the browser simulation module 322 executes multiple times for each clean URL 308. In this manner, consistency between results can be checked. For example, in some instances, redirection from a start URL is dynamic. That is, for example, at a first time, a first redirection path from a start URL is provided, and, at a second time, a second redirection path from the start URL is provided and is different from the first redirection path. By executing the browser simulation multiple times, consistency (or inconsistency) of redirect paths from a clean URL 308 can be accounted for. For example, the browser simulation can be executed three (3) times. Using the examples above, a set of request results would include six (6) request results (e.g., three sets of request results, each having two (2) request results).

In accordance with implementations of the present disclosure, and as introduced above, sets of results 310, including the set of redirection URLs, is used to train the ML model. That is, for example, multiple raw URLs 306 are provided as trusted URLs. Consequently, multiple sets of results 310 are provided and are representative of the trusted URLs. In some implementations, trusted URLs are provided from one or more trusted URL sources. Example trusted URL sources include, without limitation, domain reputation feeds (e.g., Majestic Top Million, Cisco Top Million, Alexa Top Million). By way of non-limiting example, three (3) trusted URL sources can be considered, each trusted URL source providing one million (1,000,000) trusted URLs. Accordingly, an example set of trusted URLs can include a total of three million (3,000,000) trusted URLs.

In some examples, trusted URLs can be removed from the set of trusted URLs. For example, the set of trusted URLs can be reduced from three million (3,000,000) trusted URLs to approximately one-point-four million (1,400,000) trusted URLs. In one example, duplicate trusted URLs can be provided (e.g., multiple sources of trusted URLs providing the same trusted URL). As another example, a bottom X % of trusted URLs can be removed to leave a top Y % of trusted URLs in the set of trusted URLs. For example, it can be determined that the top 80% of trusted URLs are to remain in the set of trusted URLs by removing the bottom 20% of trusted URLs. In some examples, the trusted URLs are ranked based on popularity (e.g., number of visits, number of unique visits) and the X/Y split is determined based on rank. As still another example, trusted URLs associated with foreign languages can be removed, a language being considered relative to a target language. An example target language can include English, and any trusted URLs associated with non-English pages are removed.

In some implementations, the set of trusted URLs (e.g., 1,400,000 trusted URLs) is provided as training data to train the ML model.

Figure 4:
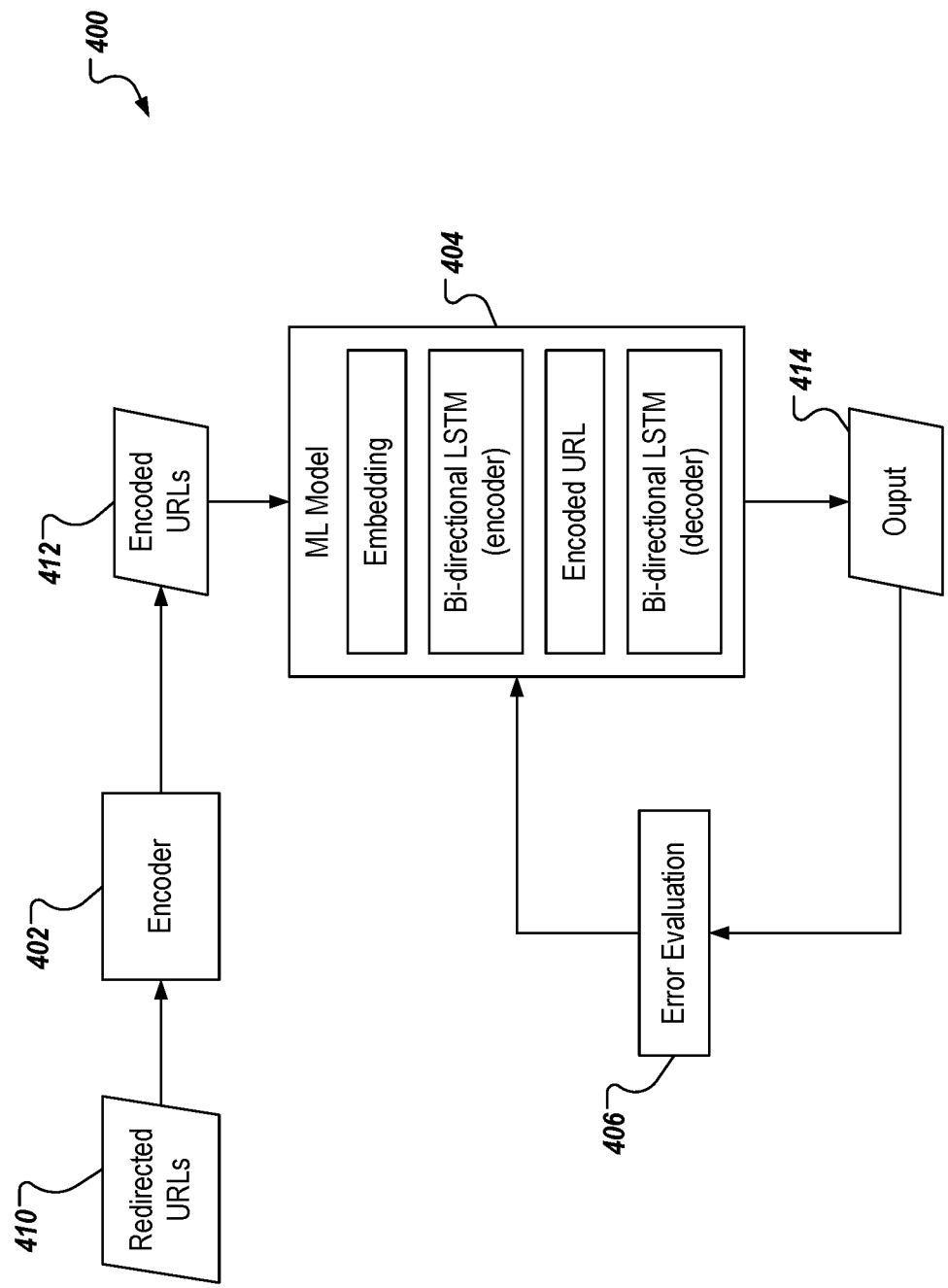
FIG. 4 depicts an example conceptual architecture in accordance with implementations of the present disclosure.

FIG. 4 depicts an example conceptual architecture 400 in accordance with implementations of the present disclosure. In the example of FIG. 4, an encoder 402, a ML model 404, and an error evaluation module 406 are provided. In some examples, the encoder 402 processes a set of redirected URLs 410 to provide a set of encoded URLs 412 that is processed to provide an output 414. The output 414 is provided to the error evaluation module 406, which provides an error value. For example, the output 414 is compared to the input to the ML model 404 (e.g., the encoded URLs 412) and the error value is determined based on a difference therebetween. In some examples, the error value can be determined as a mean-square-error (MSE) value. In some examples, a higher error value indicates a larger difference between the output 414 and the input to the ML model 404, and a lower error value a smaller difference between the output 414 and the input to the ML model 404. In some implementations, the encoder 402 independently encodes each redirected URL in the set of redirected URLs 410 to provide encoded redirected URLs. In some examples, the encoder 402 sequences the encoded redirected URLs together to provide the set of encoded URLs. Example encoding includes, without limitation, one-hot encoding, which converts raw (categorical) data into a matrix for efficient computation.

In some implementations, the ML model 404 is provided as an autoencoder having multiple layers. In some examples, the autoencoder can be described as a neural network that is trained using unsupervised learning by applying backpropagation, where output values are to be equal to input values. In short, during training, the autoencoder learns a function that enables the input to be recreated as the output. In the example of FIG. 4, the ML model 404 includes an embedding layer, an encoding layer, an encoded URL layer, and a decoding layer. In some examples, the embedding layer embeds the encoded URLs 412 in a multi-dimensional vector space. In some examples, the encoding layer is provided as a bidirectional long short-term memory (LSTM) encoder, and the decoding layer is provided as a bidirectional LSTM decoder. In general, the encoder-decoder layers can be collectively described as a recurrent neural network (RNN) that provides sequence-to-sequence prediction (e.g., forecasting next values in a sequence of values). In general, the encoding layer reads an input sequence from the embedding layer, and encodes the input sequence into a fixed-length vector. The decoding layer decodes the fixed-length vector and outputs a predicted sequence (e.g., as the output 414).

During training, and as introduced above, the set of trusted URLs (e.g., 1,400,000 trusted URLs) is provided as training data to train the ML model 404. In some implementations, each trusted URL is processed through the redirection resolver, as described above with reference to FIG. 3), to provide a set of results that includes a set of redirected URLs that represent redirections from the trusted URL to a trusted end URL. In this manner, a set of redirected URLs is provided for each trusted URL. During training of the ML model 404, each set of redirected URLs is provided as a set of redirected URLs 410 that is processed as described herein. Training of the ML model 404 iterates over the training data to minimize an error between the output 414 and the input to the ML model (e.g., the encoded URLs 412). That is, for a set of redirected URLs, if the error between the output 414 and the input exceeds a threshold training error, parameters of the ML model 414 are adjusted and training continues. In some examples, training continues until the error is minimized across the training data.

In accordance with implementations of the present disclosure, and as described above, the ML model 404 is trained based on trusted URLs. More particularly, the ML model 404 is trained based on redirects from a trusted start URL to a trusted end URL, which can include redirects through one or more trusted intermediate URLs. In this manner, the ML model 404 is trained to recognize trusted URLs and corresponding trusted behavior (e.g., redirection patterns).

During production use, the redirected URLs 410 are provided based on a URL that is received. In some examples, the URL is provided from a requestor. For example, the URL resolution platform can receive the URL through an API (e.g., from a SIEM platform that requests resolution of the URL through the API). In some examples, the URL is received as a raw URL that is processed to provide a clean URL (e.g., as described above with reference to FIG. 3). In some examples, the URL is processed through the redirection resolver, as described above with reference to FIG. 3, to provide a set of results that includes a set of redirected URLs that represent redirections from the URL to an end URL. The set of redirected URLs is provided as the set of redirected URLs 410 that is processed to provide the set of encoded URLs 412, as described herein. The set of encoded URLs 412 is processed through the ML model 404 to provide the output 414.

In some examples, an error value is determined based on the output 414 and the input to the ML model 404. As noted above, the ML model 404 is trained to recognize trusted URLs and corresponding behavior (e.g., redirection patterns). Consequently, if the URL behaves like a trusted URL (considered collectively), the error is relatively small. However, if the URL does not behave like a trusted URL (e.g., so potentially malicious), the error is relatively large. In some examples, the error is compared to a threshold production error. If the error exceeds the threshold production error, the URL is flagged as potentially malicious. In some implementations, the URL resolution platform provides a response that includes an indicator and a score. In some examples, the indicator indicates whether the URL is potentially malicious, and the score is provided as the error score determined for the URL.

Figure 5:
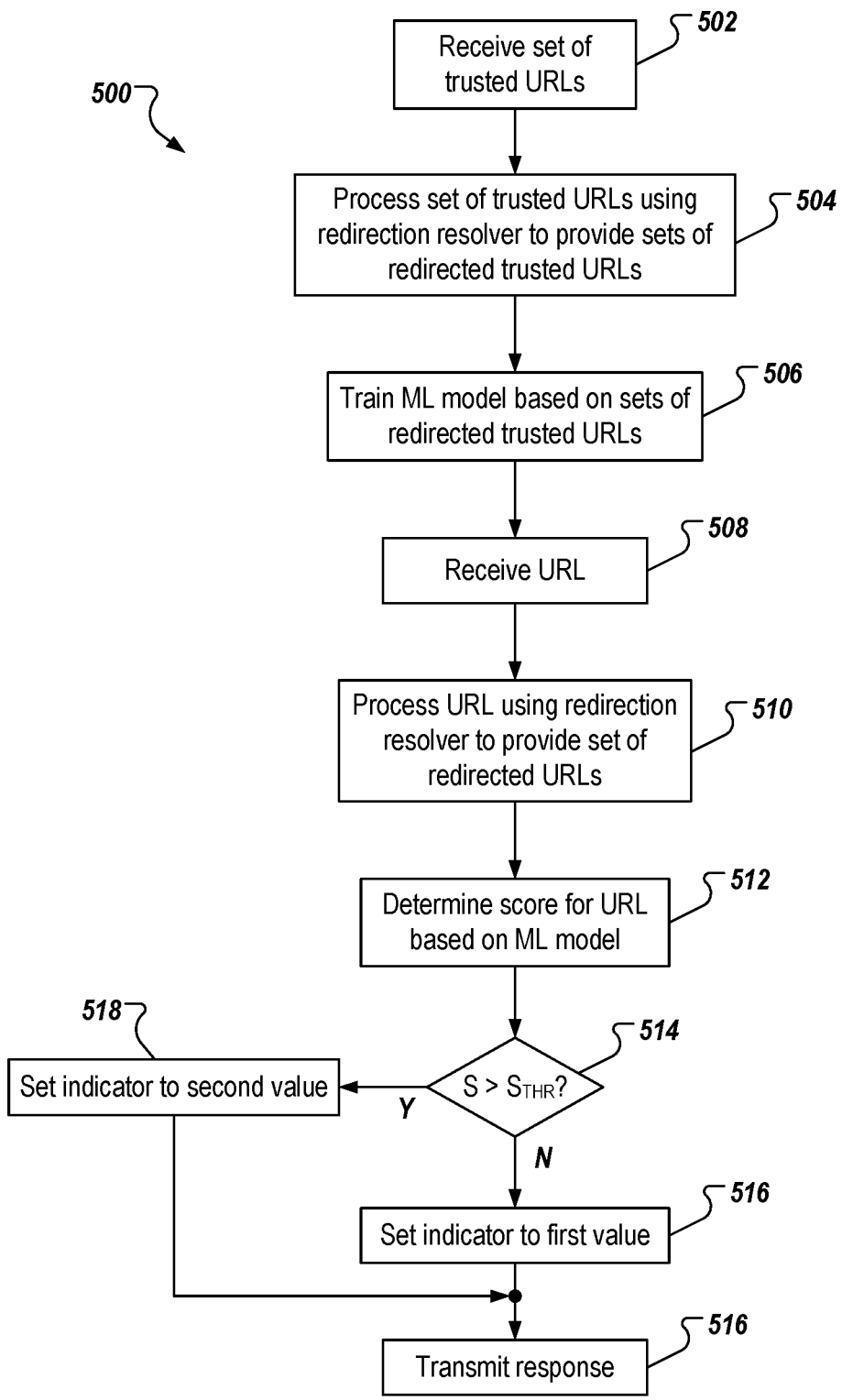
FIG. 5 depicts an example process that can be executed in implementations of the present disclosure.

FIG. 5 depicts an example process 500 that can be executed in implementations of the present disclosure. In some examples, the example process 500 is provided using one or more computer-executable programs executed by one or more computing devices (e.g., the back-end system 106 of FIG. 1).

A set of trusted URLs is received (502). For example, the URL resolution platform of the present disclosure receives one or more sets of trusted URLs from respective sources, as described herein. In some examples, the URL resolution platform processes the set of trusted URLs to reduce a number of trusted URLs included in the set of trusted URLs (e.g., reducing from approximately 3,000,000 to approximately 1,400,000). The set of trusted URLs is processed to provide sets of redirected trusted URLs (504). For example, and as described herein with reference to FIG. 3, each trusted URL in the set of trusted URLs is process through a HTTP scanner and a browser simulator to provide a respective set of redirected trusted URLs. In some examples, each trusted URL is processed through the HTTP scanner based on a set of HTTP methods to provide a sub-set of results that represents one or more server redirects of the trusted URL. In some examples, processing each trusted URL through the HTTP scanner is executed multiple times to account for any inconsistency in redirections. In some examples, processing each trusted URL through the HTTP scanner includes processing both HTTP and HTTPS protocols. In some examples, each trusted URL is processed through the browser simulator to provide a sub-set of results that represents one or more page redirects of the trusted URL. In some examples, processing each trusted URL through the browser simulator is executed multiple times to account for any inconsistency in redirections. In some examples, processing each trusted URL through the browser simulator includes processing both HTTP and HTTP secure (HTTPS) protocols.

A ML model is trained based on the set of redirected trusted URLs (506). In some examples, the ML model is provided as an autoencoder that is trained based on redirection behavior of a set of trusted URLs. In some examples, the redirection behavior is represented in the sets of redirected trusted URLs. In some examples, and as described in further detail herein, the ML model is trained using unsupervised learning by applying backpropagation, where output values are to be equal to input values. In some examples, training of the ML model iterates over the sets of redirected URLs (training data) to minimize an error between the output and the input to the ML model. That is, for a set of redirected URLs, if the error between the output and the input exceeds a threshold training error, parameters of the ML model are adjusted and training continues. In some examples, training continues until the error is minimized across the training data.

A URL is received (508). For example, the URL resolution platform of the present disclosure receives a request including the URL from a source (e.g., from a STEM platform that requests resolution of the URL through an API). The URL is processed to provide a set of redirected URLs (510). For example, and as described herein, the is processed through the HTTP scanner and the browser simulator to provide a set of redirected URLs. In some examples, the URL is processed through the HTTP scanner based on the set of HTTP methods to provide a sub-set of results that represents one or more server redirects of the URL. In some examples, processing the URL through the HTTP scanner is executed multiple times to account for any inconsistency in redirections. In some examples, processing the URL through the HTTP scanner includes processing both HTTP and HTTPS protocols. In some examples, the URL is processed through the browser simulator to provide a sub-set of results that represents one or more page redirects of the URL. In some examples, processing the URL through the browser simulator is executed multiple times to account for any inconsistency in redirections. In some examples, processing the URL through the browser simulator includes processing both HTTP and HTTP secure (HTTPS) protocols.

A score for the URL is determined (512). For example, and as described herein, the set of redirected URLs provided for the URL is processed, and the ML model provides an output based on the set of redirected URLs. In some examples, the score for the URL can be determined based on an error value assigned to an output of the ML model. It is determined whether the score (S) exceeds a threshold score (STHR) (514). If the score does not exceed the threshold score, the URL is determined to not be associated with malicious activity and an indicator is set to a first value (e.g., GOOD) (516). If the score does exceed the threshold score, the URL is determined to be associated with malicious activity and an indicator is set to a second value (e.g., BAD) (518). A response is transmitted (516). For example, the URL resolution platform transmits a response to a source of the request that included the URL. In some examples, the response includes the indicator.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for identifying potentially malicious uniform resource locator (URLs) based on redirection behavior, the method being executed by one or more processors and comprising:
   receiving, by a redirection resolver, a URL identifying a location of a network resource;
   processing, by the redirection resolver, the URL to provide a set of results comprising a set of redirection URLs, the set of redirection URLs comprising one or more redirections between the URL and an end URL;
   processing the set of redirection URLs to provide input to a machine learning (ML) model that generates an output based on the set of redirection URLs;
   determining an error value associated with the URL; and
   providing an indicator assigned to the URL based on the error value, the indicator indicating whether the URL is determined to be potentially malicious.

2. The method of claim 1, wherein processing the URL to provide the set of results comprises processing the URL through a hypertext transfer protocol (HTTP) scanner based on a set of HTTP methods to provide a sub-set of results that represents one or more server redirects of the URL.

3. The method of claim 2, wherein processing the URL through the HTTP scanner is executed multiple times to account for any inconsistency in redirections.

4. The method of claim 2, wherein processing the URL through the HTTP scanner comprises processing both HTTP and HTTP secure (HTTPS) protocols.

5. The method of claim 1, wherein processing the URL to provide the set of results comprises processing the URL through a browser simulator to provide a sub-set of results that represents one or more page redirects of the URL.

6. The method of claim 5, wherein processing the URL through the browser simulator is executed multiple times to account for any inconsistency in redirections.

7. The method of claim 5, wherein processing the URL through the browser simulator comprises processing both HTTP and HTTP secure (HTTPS) protocols.

8. The method of claim 1, wherein the ML model comprises an autoencoder that is trained based on redirection behavior of a set of trusted URLs.

9. The method of claim 8, wherein the autoencoder comprises an embedding layer, an encoding layer, an encoded URL layer, and a decoding layer.

10. The method of claim 1, wherein providing the indicator comprises:
comparing the error value to a threshold error value; and
determining that the error value exceeds the threshold error value, and in response, setting the indicator to a value that indicates that the URL is potentially malicious.

11. The method of claim 1, wherein providing the indicator comprises:
comparing the error value to a threshold error value; and
determining that the error value does not exceed the threshold error value, and in response, setting the indicator to a value that indicates that the URL is not potentially malicious.

12. A non-transitory computer-readable storage medium coupled to one or more processors and having instructions stored thereon which, when executed by the one or more processors, cause the one or more processors to perform operations for identifying potentially malicious uniform resource locator (URLs) based on redirection behavior, the operations comprising:
receiving, by a redirection resolver, a URL identifying a location of a network resource;
processing, by the redirection resolver, the URL to provide a set of results comprising a set of redirection URLs, the set of redirection URLs comprising one or more redirections between the URL and an end URL;
processing the set of redirection URLs to provide input to a machine learning (ML) model that generates an output based on the set of redirection URLs;
determining an error value associated with the URL; and
providing an indicator assigned to the URL based on the error value, the indicator indicating whether the URL is determined to be potentially malicious.

13. The computer-readable storage medium of claim 12, wherein processing the URL to provide the set of results comprises processing the URL through a hypertext transfer protocol (HTTP) scanner based on a set of HTTP methods to provide a sub-set of results that represents one or more server redirects of the URL.

14. The computer-readable storage medium of claim 13, wherein processing the URL through the HTTP scanner is executed multiple times to account for any inconsistency in redirections.

15. The computer-readable storage medium of claim 13, wherein processing the URL through the HTTP scanner comprises processing both HTTP and HTTP secure (HTTPS) protocols.

16. The computer-readable storage medium of claim 12, wherein processing the URL to provide the set of results comprises processing the URL through a browser simulator to provide a sub-set of results that represents one or more page redirects of the URL.

17. The computer-readable storage medium of claim 16, wherein processing the URL through the browser simulator is executed multiple times to account for any inconsistency in redirections.

18. The computer-readable storage medium of claim 16, wherein processing the URL through the browser simulator comprises processing both HTTP and HTTP secure (HTTPS) protocols.

19. The computer-readable storage medium of claim 12, wherein the ML model comprises an autoencoder that is trained based on redirection behavior of a set of trusted URLs.

20. The computer-readable storage medium of claim 19, wherein the autoencoder comprises an embedding layer, an encoding layer, an encoded URL layer, and a decoding layer.

21. The computer-readable storage medium of claim 12, wherein providing the indicator comprises:
comparing the error value to a threshold error value; and
determining that the error value exceeds the threshold error value, and in response, setting the indicator to a value that indicates that the URL is potentially malicious.

22. The computer-readable storage medium of claim 12, wherein providing the indicator comprises:
comparing the error value to a threshold error value; and
determining that the error value does not exceed the threshold error value, and in response, setting the indicator to a value that indicates that the URL is not potentially malicious.

23. A system, comprising:
one or more processors; and
a computer-readable storage device coupled to the one or more processors and having instructions stored thereon which, when executed by the one or more processors, cause the one or more processors to perform operations for identifying potentially malicious uniform resource locator (URLs) based on redirection behavior, the operations comprising:
receiving, by a redirection resolver, a URL identifying a location of a network resource;
processing, by the redirection resolver, the URL to provide a set of results comprising a set of redirection URLs, the set of redirection URLs comprising one or more redirections between the URL and an end URL;
processing the set of redirection URLs to provide input to a machine learning (ML) model that generates an output based on the set of redirection URLs;
determining an error value associated with the URL; and
providing an indicator assigned to the URL based on the error value, the indicator indicating whether the URL is determined to be potentially malicious.

24. The system of claim 23, wherein processing the URL to provide the set of results comprises processing the URL through a hypertext transfer protocol (HTTP) scanner based on a set of HTTP methods to provide a sub-set of results that represents one or more server redirects of the URL.

25. The system of claim 24, wherein processing the URL through the HTTP scanner is executed multiple times to account for any inconsistency in redirections.

26. The system of claim 24, wherein processing the URL through the HTTP scanner comprises processing both HTTP and HTTP secure (HTTPS) protocols.

27. The system of claim 23, wherein processing the URL to provide the set of results comprises processing the URL through a browser simulator to provide a sub-set of results that represents one or more page redirects of the URL.

28. The system of claim 27, wherein processing the URL through the browser simulator is executed multiple times to account for any inconsistency in redirections.

29. The system of claim 27, wherein processing the URL through the browser simulator comprises processing both HTTP and HTTP secure (HTTPS) protocols.

30. The system of claim 23, wherein the ML model comprises an autoencoder that is trained based on redirection behavior of a set of trusted URLs.

31. The system of claim 30, wherein the autoencoder comprises an embedding layer, an encoding layer, an encoded URL layer, and a decoding layer.

32. The system of claim 23, wherein providing the indicator comprises:
comparing the error value to a threshold error value; and
determining that the error value exceeds the threshold error value, and in response, setting the indicator to a value that indicates that the URL is potentially malicious.

33. The system of claim 23, wherein providing the indicator comprises:
comparing the error value to a threshold error value; and
determining that the error value does not exceed the threshold error value, and in response, setting the indicator to a value that indicates that the URL is not potentially malicious.

* * * * *